UNITED STATES PATENT OFFICE.

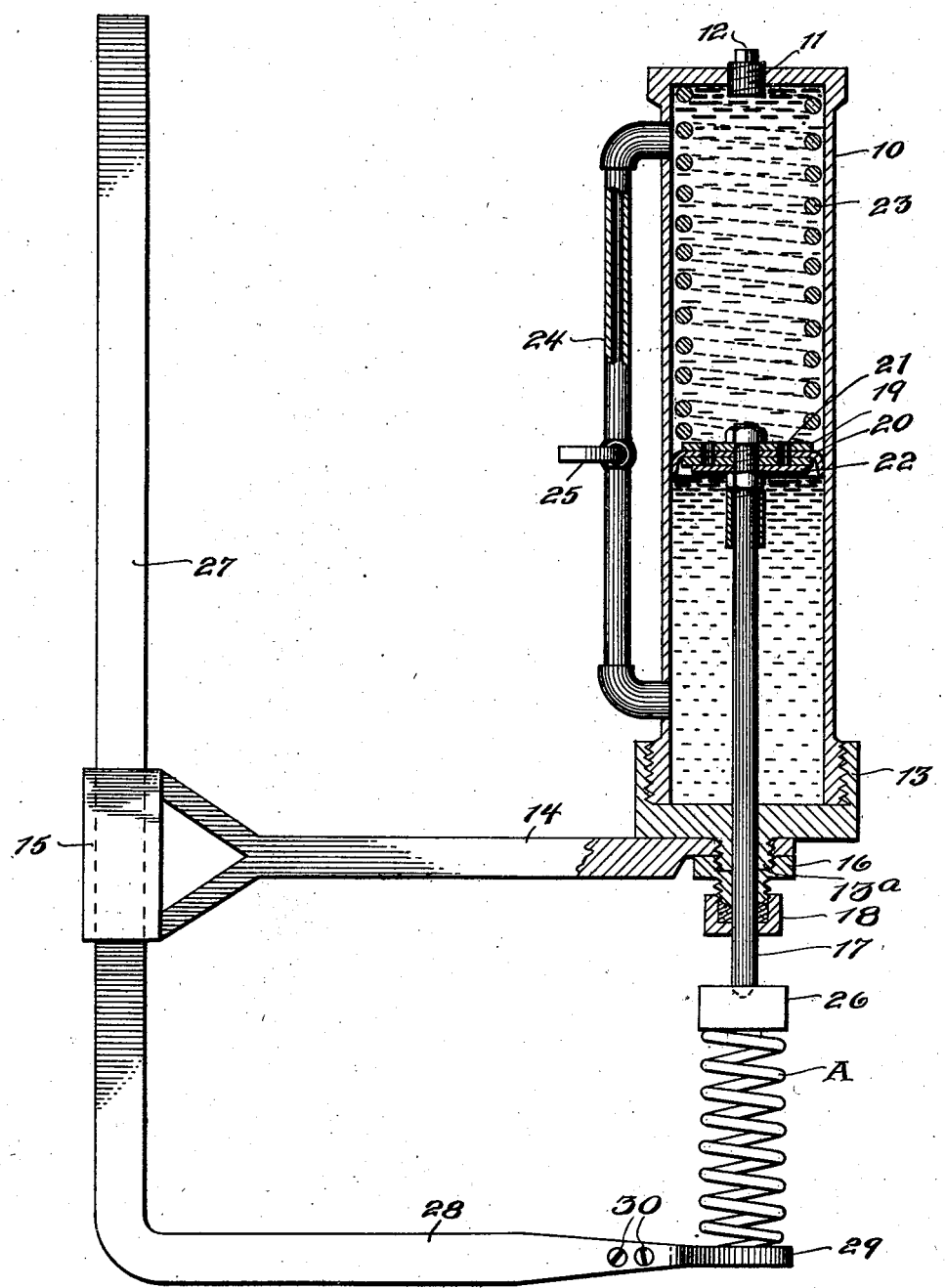

FRANK E. JENKINS, OF MEDFORD, OREGON.

VALVE-SPRING COMPRESSOR.

1,351,424.  Specification of Letters Patent.  Patented Aug. 31, 1920.

Application filed July 17, 1919. Serial No. 311,480.

*To all whom it may concern:*

Be it known that I, FRANK E. JENKINS, a citizen of the United States, residing at Medford, in the county of Jackson and State of Oregon, have invented new and useful Improvements in Valve-Spring Compressors, of which the following is a specification.

This invention relates to tools for compressing valve springs of automobile, aeroplane, or other gasolene motors, and has for its object the provision of a device adapted to be engaged upon a valve spring to be compressed and so constructed that after the device is initially set in proper position it will automatically compress the valve spring.

An important object is the provision of a device of this character which is of the hydraulic type and which embodies in its construction an operating spring of greater strength than the strength of any ordinary valve spring whereby to effect compressing action on the valve spring.

An additional object is the provision of a device of this character which will be simple and inexpensive in manufacture, which may be readily adjusted for use, which will be efficient and durable in service, and a general improvement in the art.

With the above and other objects and advantages in view, the invention consists in the details of construction to be hereinafter more fully described and claimed, and illustrated in the accompanying drawing in which The figure shows a longitudinal sectional view through my device in operative position with respect to a valve spring.

Referring more particularly to the drawing, the device comprises a cylindrical casing 10 which has its upper end closed except for a filling opening 11 closed by a removable plug 12. At its other end the cylinder 10 is closed by a head 13 threaded thereonto and having a threaded reduced extension 13$^a$. Disposed against the head 13 is a laterally extending arm 14 having a hole receiving the extension 13$^a$ and terminating in a square socket member 15. Adjacent the arm 14 is provided a nut member 16 threaded onto the extension 13$^a$ in clamping engagement with the arm 14 and which is provided with a central hole registering with the holes formed in the adjacent end of the arm 14 and extension 13$^a$. A plunger rod 17 extends through these registering holes in the casing 10, and a stuffing box 18 is provided for making a fluid-tight joint. Secured upon the end of the rod 17 within the casing is a plunger 19 having a cup washer 20 facing toward the bottom of the cylinder. Formed through the plunger 19 are holes 21 covered by a flexible disk 22 and constituting a check valve structure. Disposed within the cylinder and abutting against the top of the plunger 19 and against the underside of the upper end of the casing, is a coil spring 23 having greater resilience or tension than the ordinary valve spring.

The cylinder 10 is filled with liquid, preferably oil, and communication between the ends of the cylinder at opposite sides of the plunger 19 is effected by means of a by-pass pipe 24 provided with a cut-off cock 25.

The projecting end of the plunger rod 17 carries or is engaged with a member 26 formed for engagement with one end of a valve spring A to be compressed. Associated with the cylinder structure above described, is an L-shaped member comprising a vertical arm 27 slidably engaged within the socket member 15 and further including a horizontal arm 28 having a split end portion 29 adapted for engagement with the other end of the spring A. Adjusting screws 30 are provided in the arm 28 for adapting the device to different valves.

In the use of the device, the cock 25 is first closed and the operator places the projecting end of the plunger 17 upon a table, bench, or the like, and presses downwardly upon the cylinder 10 whereupon the plunger 19 will be moved upwardly within the cylinder, the oil in advance of the plunger passing through the passages 21 into the space back of the plunger. During this movement the spring 23 is of course compressed. When the plunger 19 has been moved a proper distance to produce a sufficient tension upon the spring 23, and pressure is relieved, the plunger 19 will be held immovable as the disk or washer 22 will close the passages 21 and prevent passage of the oil through the plunger. The cup washer 20 also acts in substantially the same manner. The device being thus adjusted, the arm 28 is so positioned with respect to the spring to be compressed that the end 29 will engage beneath one end of the spring and the member 26 is engaged upon the other end of the spring. Owing to the slidable engagement of the vertical arm 27 of the L-shaped rod within the socket member 15, the horizontal arm 28 of this member may be adjusted toward the arm 14 so that the spring A to be compressed will be properly engaged. The operator then opens the cock 25 whereupon the spring 23, having greater tension than the spring A will force the plunger 19 and plunger rod 17 downwardly, compressing the spring A. This downward movement of the plunger 19 is possible for the reason that when the cock 25 is opened the oil below the plunger 19 will be forced through the by-pass pipe 24 and into the upper end of the cylinder. The frictional binding where the rod 27 passes through the socket member 15 will hold the parts in this position until it is desired to release pressure upon the spring, which is accomplished by pulling apart slightly the top of the cylinder 10 and top of the vertical arm 27, thus relieving the fraction of arm 27 in the socket 15.

From the foregoing description and a study of the drawing it will be apparent that I have thus provided a simple device of a hydraulic nature which is so constructed that it may be quickly and easily used for operating upon internal combustion engine valve springs for effecting compression thereof for any desired purpose.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:—

1. A device of the character described comprising a cylinder closed at both ends and provided within one end with a filling opening having a plug threaded therein, a by-pass pipe communicating at its ends with the ends of said cylinder, a cut-off cock in said pipe, a plunger disposed within said cylinder and including a cup washer facing toward the bottom thereof, downwardly opening check valves in said plunger, a rod connected with said plunger and extending beyond the lower end of said cylinder, a coil spring disposed within the upper part of said cylinder for urging said plunger downwardly, the resilience of said spring being greater than the resilience of any spring to be compressed by the device, said cylinder containing oil, a laterally extending arm at the lower end of said cylinder provided at its end with a socket, an L-shaped rod having one arm slidably engaged within said socket, and its other arm disposed in parallel relation to said lateral arm with its end in alinement with said plunger rod, and a member engaged by the lower end of said plunger rod and engageable with one end of a spring to be compressed, the other end of the spring to be compressed being disposed upon the end of said last named arm.

2. A valve spring compressor comprising a cylinder closed at both ends and provided with a by-pass communicating with both ends thereof and provided with a cut-off cock, said cylinder containing a liquid, a spring compressed plunger within said cylinder provided with check valves, a rod connected with said plunger and projecting beyond one end of the cylinder, a lateral arm extending from the cylinder, an L-shaped arm slidably associated with said lateral arm and having its end disposed in alinement with said plunger rod.

3. A device of the character described comprising a liquid containing cylinder provided with a valve controlled by-pass communicating with the ends thereof, a spring pressed plunger slidable within said cylinder and provided with check valves, a plunger rod connected with said plunger and projecting beyond one end of said cylinder, and a rod slidable with respect to said cylinder and having a portion coöperating with the projecting end of said plunger rod whereby both ends of a spring to be compressed may be engaged.

4. A spring compressor including a cylinder, a spring actuated piston in said cylinder, a rod connected to the piston and having a spring engaging end projecting beyond one end of the cylinder, a spring rest having a portion opposing the said spring enaging end of the rod, and a bracket carried by the cylinder and adjustably supporting the said spring rest as described.

FRANK E. JENKINS.